Aug. 11, 1953     F. H. STEARNS ET AL     2,648,578
BEARING AND METHOD OF MAKING SAME

Filed April 2, 1949     2 Sheets-Sheet 1

Inventors:
Frank H. Stearns,
Arthur J. Thibault
By
Chester A. Williams
Attorney

Aug. 11, 1953   F. H. STEARNS ET AL   2,648,578
BEARING AND METHOD OF MAKING SAME
Filed April 2, 1949   2 Sheets-Sheet 2

Inventors:
Frank H. Stearns
Arthur J. Thibault
By Chester A. Williams
Attorney

Patented Aug. 11, 1953

2,648,578

UNITED STATES PATENT OFFICE 2,648,578

BEARING AND METHOD OF MAKING SAME

Frank H. Stearns, Meriden, and Arthur J. Thibault, Enfield, N. H., assignors to Split Ballbearing Corporation, Lebanon, N. H., a corporation of New Hampshire Application April 2, 1949, Serial No. 85,074

5 Claims. (Cl. 308—196)

The present invention relates to bearing structures, and more particularly to a bearing structure of the divisible race type, and to a method of producing the same.

The United States patents of Winslow S. Pierce, Jr., Nos. 1,498,748 and 1,675,728, granted on June 24, 1924 and July 3, 1928, respectively, each discloses a bearing structure of the divisible race type, while the United States patent of Winslow S. Pierce, Jr., No. 1,630,759, granted on May 31, 1927, discloses a method for producing bearing structures of this type.

More specifically, the above-noted Pierce patents are concerned with a bearing structure in which either the inner or the outer race element is fractured into two segments. In other words, the Pierce method consisted in machining an annular ring of metal to the requisite bearing race dimensions, hardening the metal, breaking or fracturing the race longitudinally into two separate segments, and then finally assembling the race with its complementary race and bearing balls into a complete bearing unit. Such a type of bearing is most advantageous when used in applications where it is impossible or impractical to slip a one-piece race onto a shaft, as, for example, in the case of an automobile crankshaft. Furthermore, such a construction permits the use in a bearing unit of a full complement of bearing balls or rollers; the number of such balls or rollers used depending upon the pitch circumference of the unit. No spacing cage need be employed in such a bearing, and, of course, such a bearing construction does not require a filling slot for the purpose of facilitating the introduction of the balls or rollers between the cooperating inner and outer race rings.

Once assembled, however, the above type of bearing unit must have the two segments of its split race ring held together by either a permanent or a temporary segment-confining member, so that the bearing unit may be readily handled, both from an assembly as well as from a shipping standpoint, without falling apart. The present invention has been devised to overcome this, as well as other difficulties found in the prior art devices.

A principal object of this invention is to provide a bearing unit with an outside race element which is broken or fractured longitudinally of its axis, but at one location only along its periphery, so as to provide an integral split ring which, in its normal condition, forms a full perfect circle, but which ring, at the same time, may be separated in the area of its fracture, thereby to form a passage through which bearing balls or rollers may be introduced between such outside ring in its associated inner race ring. By reason of this construction, the complete bearing unit may contain a full complement of bearing ball or roller elements and at the same time be readily handled both in assembly and in shipping, without the addition of special devices for holding the split race together.

The invention will be understood from the following description in connection with the accompanying drawings which illustrate the improved bearing and the method of producing the same, and in which.

Figure 1:
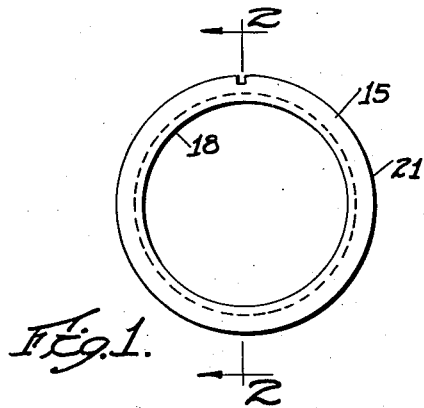
Fig. 1 represents an annular metallic ring used in the manufacture of the present invention.
Figure 2:
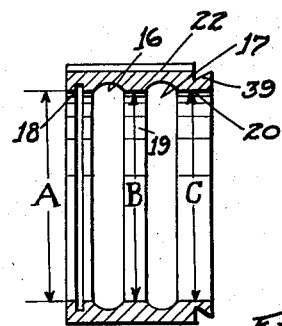
Fig. 2 represents a sectional view taken substantially along the line 2—2 of Fig. 1.

The first embodiment of the invention disclosed in the drawings, illustrates an outer ball race made from a single cylindrical piece of metal. This cylinder is machined to its final dimensions both inside and out. More specifically, the outer race element is first formed as an annular ring of metal 15, the inner diameter of which may be provided with one or more ball-receiving grooves 16 and 17 which are machined to their final dimensions. The inner lands 18, 19 and 20 are also machined to their final dimensions, as is the outer peripheral portion 21. Thereafter, a narrow groove 22 may be formed longitudinally of the ring, as best disclosed in Figs. 1 and 2. The purpose of this groove on the outside of the cylinder is to form a weak plane in the cylinder, so that when it is broken, the fracture will occur in a predetermined plane.

The cylinder is now ready to be hardened, and the hardening may be accomplished by the usual heat treating methods; the ultimate degree of hardness being immaterial to the present invention, with the exception that it should be such as to permit the ring to be separated in the area of its fracture a predetermined distance, without exceeding the elastic limit of the material from which the ring is fabricated.

After the ring is hardened, it is broken along the weak plane as determined by the groove 22. The breaking force which may be applied by any suitable means, is preferably applied at right angles to the plane of fracture. Care must be taken so as not to injure the broken surfaces, for it is absolutely necessary for the two broken surfaces to mate together exactly, so as to form a perfect cylinder which will present a smooth path for the bearing balls or rollers.

Figure 4:
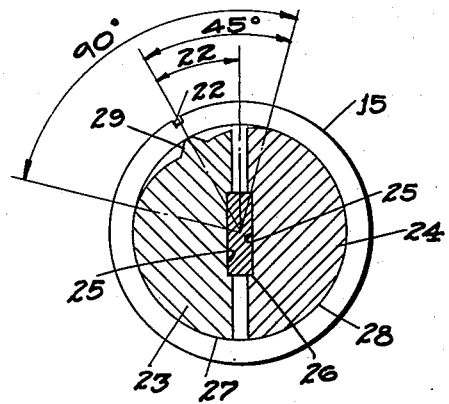
Fig. 4 represents a sectional view taken substantially along the line 4—4 of Fig. 3.
Figure 3:
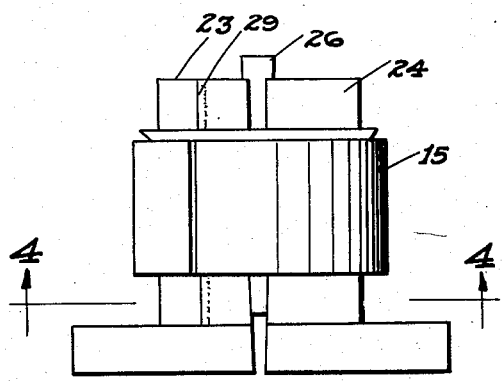
Fig. 3 represents an elevation view showing the annular ring as placed over an internal expansion device.

In order properly to split the ring 15, the latter may be placed over a pair of complementary internal expansion members 23 and 24 which are illustrated in Figs. 3 and 4. Referring particularly to Fig. 4, it is to be noted that these expansion members 23 and 24 are each provided lengthwise thereof with a groove 25, so as to accommodate a wedge element 26. It will be appreciated that these grooves 25, 25 are sloped thereby snugly to receive the wedge 26, so that the expansion members 23 and 24 may have their arcuate surfaces 27 and 28 snugly engage the land portions of the ring 15.

Still referring particularly to Fig. 4, it is to be understood that the cooperating expansion members 23 and 24 snugly fit the land portions of the bearing ring 15 for about 270 degrees of the ring circumference. The center of curvature of the remaining 90 degrees is altered by an amount close to the height of a button or projection element 29 formed longitudinally of the expansion member 23. In this connection, it might be stated that experience has shown that successful results may be obtained when the button 29 is about .015 of an inch in height. Also, experience has indicated that good results are obtained whenever this button 29 is located approximately 30 degrees from the division of the separable members 23 and 24, in a manner as best indicated in Fig. 4.

Figure 5:
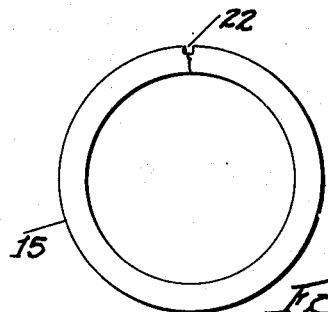
Fig. 5 represents a view of the annular ring after the latter has been fractured.
Figure 8:
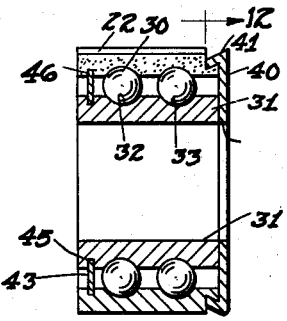
Fig. 8 represents a sectional view taken substantially along the line 8—8 of Fig. 7.

With the ring in the position as shown in Figs. 3 and 4, the wedge 26 is gradually forced between the members 23 and 24, so that the ring is first placed in tension about its entire circumference. Further insertion of the wedge between the expansion members 23 and 24 will produce a slight bending of the ring in the sections adjacent to the button or projection 29. The net result of both of these tension and bending stresses is to produce a fracture in a plane which passes through the center of the ring curvature and the groove 22. Referring particularly to Fig. 8, one of the fractured surfaces is designated by the numeral 30. As soon as the ring 15 fractures or splits, the wedge 26 is withdrawn, and thereafter the ring may be removed from the members 23 and 24. It is to be understood that such a fracturing process does not distort the ring itself, and thus the latter, in its normal position, will present an entirely closed perfect annular ring, as is illustrated in Fig. 5. Also, it will be appreciated that such a fracture will not present any detrimental parting line in the area of the ball-receiving grooves 16 and 17, for the inner surfaces of the ring in the area of the fracture, mate together in a perfect interlocking relation.

Figure 6:
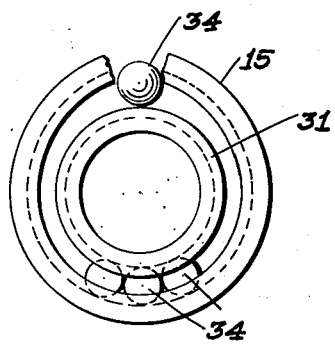
Fig. 6 represents the fractured annular ring as disposed in an open position, so as to permit bearing balls to be disposed between such ring and a cooperating inner ring.

Upon the completion of the fracturing process, the ring 15 is then ready to be assembled with its component parts into a complete bearing unit. More specifically, the fractured ring 15 is disposed about a conventional type of inner race ring 31 which is provided with a pair of bearing-receiving grooves 32 and 33 which correspond to the outer grooves 16 and 17 provided in the outer race 15. Referring particularly to Fig. 6, the races 15 and 31 are disposed in an eccentric relation relative to each other, with the inner race 31 positioned remote from the fractured portion of the outer race 15. Thereafter, the outer race 15 is spread apart in the area of its fracture, so as to permit conventional type spherical bearing balls 34—34 to be inserted between the inner and outer races. In this latter connection it is to be understood that it is not necessary to separate the free end portions of the outer race a distance equal to the diameter of a bearing ball 34, for, as above noted, the inner and outer races are positioned eccentric of each other. In other words, by spreading the free end portions of the split ring 15 a distance somewhat less than the ball diameter, and by positioning the inner and outer race rings in an eccentric relation, a passageway is formed between the races in the area of the fracture, which passageway will facilitate the placement of the balls into the appropriate ball-receiving grooves. The balls, of course, are inserted into these grooves in a direction parallel to the axes of the race rings. In this connection, it should further be appreciated that the dimensions of the outer race ring, and more particularly the thickness of the ring, is maintained at an optimum dimension, so as to permit the ring to be separated a sufficient distance to allow the insertion of the balls, without exceeding the elastic limit of the material employed in the race ring.

Figure 7:
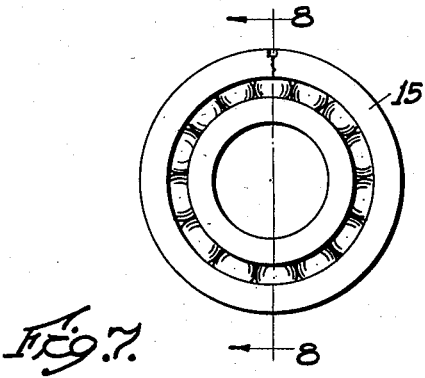
Fig. 7 represents a side elevation view of a complete bearing unit.

Still referring to Fig. 6, it will be appreciated that by this method of ball insertion, one is permitted to place a full complement of balls between the two races, so as to produce ball-to-ball contact, in a manner as best illustrated in Fig. 7. As soon as a full complement of balls has been inserted between the races, the outer race is permitted to again close, so as to form a perfect circle.

In so placing the balls between the inner and outer races 31 and 15 in a manner as above described, it will be readily appreciated that the balls will have a tendency to drop completely through the two races, rather than to be positioned within a pair of corresponding inner and outer bearing-receiving grooves. This objection can be overcome in a single row bearing of the type disclosed in Figs. 9 and 10 by providing an assembly shoulder or a sleeve device which would hold the balls in the correct position between the inner and outer races until a full complement of balls have been placed in position. As soon as the outer race ring is permitted to close over the bearings, the sleeve or shoulder device could then be removed. However, in the case of a double row bearing of the type disclosed in Figs. 2 and 8, such a bearing or shoulder device would be of little assistance in so far as the assembling of the balls is concerned.

The present invention contemplates the provision of a bearing structure which will obviate the above-noted difficulty. In this connection, reference may again be had to Fig. 2, wherein the diameters of the race lands 18, 19 and 20 are designated respectively by the letters A, B and C. The present invention contemplates that the diameter A be held at a minimum figure, while the diameter C is maintained at a maximum figure. The diameter B, on the other hand, should be maintained at a mean figure. The difference, however, between the diameters of these three lands need only be in the order of several thousandths of an inch. With this construction, it will be readily appreciated that the bearing balls may be first inserted into the ball-receiving grooves 16 and 32 of the rings 15 and 31 from the right-hand or assembly side of the bearing rings, as viewed in Figs. 2 and 8. In order to permit the insertion of a full complement of balls into the ball-receiving grooves 16 and 32, it is necessary for the outer ring to be spread apart so that the balls will pass by the lands 20 and 19, but yet be prevented from passing by the land 18. Thereafter, the bearing race 15 may be permitted to close a slight degree, after which a full complement of balls may be inserted between the grooves 17 and 33. In this latter connection, it will be understood that by permitting the outer race to close a slight degree, the balls will be prevented from passing by the land 19. With this construction, it will be readily appreciated that the balls may be quickly inserted into the grooves of a double row bearing unit, without the necessity of employing any type of auxiliary device. Furthermore, the difference in the diameters between the various lands 18, 19 and 20 has no appreciable effect on the efficiency of the bearing unit. It is clear that instead of varying the diameters of the lands 18, 19 and 20, if desired, these land diameters may be maintained at a common figure, while the corresponding land portions of the inner race 31 are formed in a graduated manner. This latter construction would permit the bearing balls to be inserted within the bearing unit in substantially the same manner as hereinabove set forth.

Figure 9:
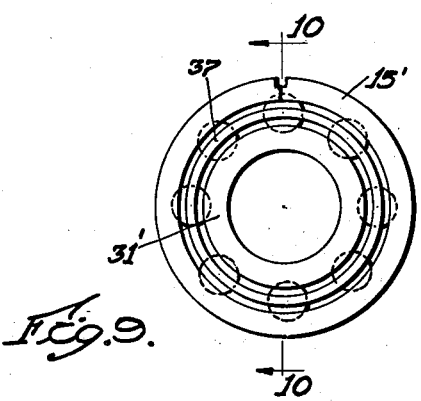
Fig. 9 represents an elevation view of a second form of bearing unit in which the present invention is incorporated.
Figure 10:
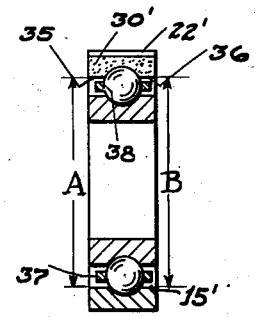
Fig. 10 represents a sectional view taken substantially along the line 10—10 of Fig. 9.

Figs. 9 and 10 illustrate a single row bearing unit comprising an outer race ring 15' and an inner race 31', it being understood that the outer race 15' is fractured in the same manner as hereinabove described in connection with that bearing unit disclosed in Figs. 1 to 8, inclusive. Referring now particularly to Fig. 10, it is to be understood that the lands 35 and 36 of the outer ring 15' are constructed of different diameters which are designated respectively as A and B. A is maintained at a minimum figure, while B is maintained at a maximum figure, the difference being some several thousandths of an inch, thereby to permit the insertion of the balls between the inner and outer rings in substantially the same manner as was described in connection with the first form of the present invention.

Figure 11:
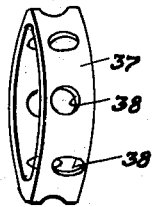
Fig. 11 represents a perspective view of a ball spacing cage which is employed in the bearing unit disclosed in Figs. 9 and 10.

Although the present bearing structure is particularly well adapted for receiving a full complement of bearing balls, it is also ideally adapted for receiving a lesser number of balls which may be separated by means of a novel cage arrangement which is best disclosed in Figs. 9 to 11. For example, such a cage may be constructed of a synthetic material such as "Textolite" which may take the form of an annular ring 37. This ring is dimensioned so as to be positioned between the inner and outer races 31' and 15', as is best disclosed in Fig. 10. By providing this ring 37 with a plurality of radial apertures 38, it will be understood that this member will function as a highly efficient ball-separating cage. In order to place the balls within the cage, it is necessary to modify slightly that method which was hereinabove described in connection with Fig. 6. In other words, in order to assemble this form of the present invention, it is necessary first to place the cage 37 between the inner and outer races and thereafter separate the outer race 15' so as to permit the balls 34 to be dropped radially between the raceway elements. Thus, in assembling this latter type of bearing unit, it is necessary to separate the outer race a greater distance than is necessary in connection with the assembly of the first form of the present invention. Those skilled in the art will appreciate, however, that the cage element 37 is not only inexpensive to manufacture, but will be highly efficient in use, as it may, for example, be constructed of self-lubricating material. Also, it may be readily assembled into the bearing unit, without the help of any special riveting or assembling machines.

Figure 12:
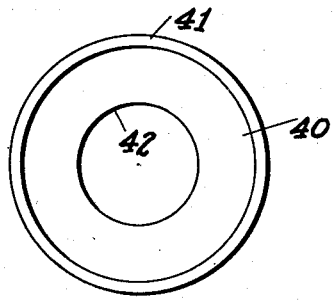
Fig. 12 represents a face view of a locking member which is disclosed in Fig. 8, and which view is taken substantially along the line 12—12 of Fig. 8.

Referring again to the first form of the present invention, it is to be understood that even though the outer race ring 15 in its normal position, forms a perfect circle, means may be provided with the bearing unit for locking this outer ring in its closed position. For example, referring to Figs. 2 and 8, one or both faces of the outer bearing ring may be provided with a circumferential groove 39 which is adapted to receive a locking cover element 40. More specifically, this locking cover element 40 may be formed substantially as a flat disk, which is best illustrated in Fig. 12. The peripheral portion of this disk may be provided with a flange 41 which is adapted to be spun or bent over into locking relation with the groove 39 of the outer ring 15, in a manner as best disclosed in Fig. 8. This locking ring when thus positioned about the outer race, will function to prevent the latter element from separating in the area of its fracture during the shipping of the same. Also, this element will function as a seal to prevent dirt and other foreign matter from entering the bearing during the operation of the same. In this latter connection, it is to be noted that the locking cover element 40 is provided with a central aperture 42 which coincides with the inner diameter of the inner race 16. Although, in Fig. 8, only one locking cover element 40 is illustrated, those skilled in the art will readily appreciate that each face of the bearing unit could be provided with such an element, so as to seal the active portions of the bearing completely.

Figure 13:
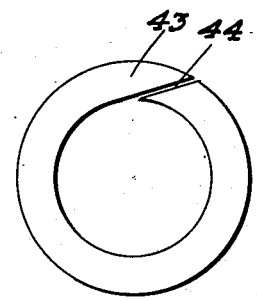
Fig. 13 represents a side elevation view of a sealing unit which is disclosed in section in Fig. 8.

Referring particularly to Figs. 8 and 13, it is to be understood that the present type of bearing may also be sealed rather effectively by means of an annular ring 43 which is illustrated best in Fig. 13. Such a ring may be constructed of "Textolite," or any other suitable material, and is provided with a slit 44, so as to permit the ring to be mounted within a groove 45 circumferentially disposed about the inner race ring 31. Once the ring is positioned within the groove

45, it will form a perfect circular barrier, the outer periphery of which may be received within a groove 46 circumferentially disposed within the inner face of the outer ring 15. Clearly, when the outer ring 15 is separated in order to receive the bearing balls, it will, at the same time, permit the inner race 31 with its assembled ring 43 to be properly mounted therewithin. As soon as the balls have been inserted between the two rings, the outer ring will be permitted to close again, and as the ring closes, it will, of course, encircle the sealing element 43 in a manner such that the latter will have its outer periphery inserted within the groove 46. As disclosed in Fig. 8, such a ring 43 forms a simple, inexpensive, but yet at the same time, highly efficient means for sealing a bearing of the present type. In this connection, it should be also understood that each face of the bearing unit could be provided with such a ring, thereby to seal completely the ball elements of the bearing unit.

We claim:

1. A bearing structure comprising inner and outer metal race rings of which the outer ring is fractured lengthwise of its longitudinal axis thereby to form a unitary ring with a pair of abutting broken ends, said fractured ring being hardened so that its broken ends are normally positioned in an intimate interlocking mating relation with each other, a pair of axially spaced annular lands formed concentrically of and circumferentially around the inner surface of said outer ring, an annular raceway groove formed in said outer ring between said lands, a second pair of axially spaced annular lands formed concentrically of and circumferentially around the outer surface of said inner ring, an annular raceway groove formed in said inner ring between said second pair of lands and directly within the confines of said first-mentioned groove, and a plurality of bearing elements disposed between said inner and outer rings and within said grooves, said lands being so formed that the radial spacing between the corresponding inner and outer lands at one side of the two complementary grooves is normally less than the diameter of one of said bearing elements but slightly greater than that radial spacing between the other two inner and outer lands.

2. A bearing structure comprising inner and outer race rings of which the outer ring is fractured lengthwise of its longitudinal axis thereby to form a unitary ring with a pair of abutting broken ends, said fractured ring being hardened so that its broken ends are normally positioned in an intimate interlocking mating relation with each other, three axially spaced annular lands formed concentrically of and circumferentially around the inner surface of said outer ring, a pair of annular raceway grooves formed in said outer ring in alternate relation with said lands, a second series of three axially spaced annular lands formed concentrically of and circumferentially around the outer surface of said inner ring, a pair of annular raceway grooves formed in said inner ring in alternate relation with the second series of lands and with each of the inner grooves disposed directly within the confines of a respective one of the outer grooves, and a plurality of bearing elements disposed within the two pairs of oppositely disposed grooves, said lands being so formed that the radial spacing between each of the three pairs of corresponding inner and outer lands varies in a graduated manner from one side of the bearing structure to the other but with the largest spacing being normally smaller than the diameter of one of said bearing elements.

3. The method of constructing a bearing structure, which consists in machining to its proper dimensions an outer race ring having an internal annular raceway, scoring the outer surface of said ring with a single groove disposed lengthwise of the ring axis, hardening said ring, placing within said ring an expansion device comprising two members each with one semi-cylindrical surface having a radius substantially equal to that of the ring bore, and with one of said members having its semi-cylindrical surface relieved in an area adjacent to one edge portion of the other member, to provide a rib projecting outwardly from the mid portion of the relieved area and disposed longitudinally of its associated member, said two members being disposed within said ring so that said rib will be disposed in line with and adjacent to the scored groove on said ring, applying a force between said two members so as to separate them until said ring fractures along the scored groove, removing said two members from said ring, placing within said ring an inner race ring having an external annular raceway groove, spreading apart the broken ends of said outer ring without exceeding the elastic limit of the ring, inserting between said two rings through the passage formed by the spaced-apart broken ends of said outer ring a plurality of bearing elements, and finally permitting the broken ends of said outer ring to snap back into their normal interlocking mating relation.

4. A ball bearing structure comprising continuous circular concentrically disposed inner and outer metal race rings having complementary annular raceway grooves on their adjacent surfaces and a plurality of spherical bearing balls disposed between said rings in rolling engagement with the respective grooves thereof, the said outer ring being fractured lengthwise of its longitudinal axis at one point only providing complementary mating ends and being hardened prior to fracture so that its fractured ends are held against separation in intimate interlocking mating abutment with each other by the inherent resilience of the hardened metal, said outer ring, independent of engagement therewith of said bearing balls, constituting a circular unitary one-piece undeformed ring of final operating dimensions having a circular ball engaging raceway groove of smooth continuous uninterrupted surface when the fractured ends of such ring are in abutment, whereby a substantially full complement of bearing balls may be inserted between the race rings by separation of the mating ends of the outer ring.

5. The method of making an anti-friction bearing which comprises machining to circular form an outer metal race ring having at least one internal annular ball receiving raceway groove of smooth uninterrupted surface, forming a groove in said ring across the outer surface thereof substantially parallel to the ring axis, hardening said ring, fracturing said ring in a substantially radial plane at the point of said outer surface groove only by bending said ring outwardly at a point substantially opposite said outer surface groove therein while supporting against substantial inward bending substantially all of the inner surface of said ring except that adjacent the point of such bending, spreading apart the fractured ends of said outer race ring within the elastic limit of the ring, assembling within the spread outer ring a plurality of bearing balls and an inner race ring having at least one external annular ball receiving raceway groove, and finally permitting the expanded outer race ring to contract so that its fractured ends move back into mating abutment due to the resilience of the hardened ring forming metal.

FRANK H. STEARNS.
ARTHUR J. THIBAULT.

References Cited in the file of this patent

UNITED STATES PATENTS

| Number | Name | Date |
| --- | --- | --- |
| 565,186 | Taylor | Aug. 4, 1896 |
| 845,632 | Gurney | Feb. 26, 1907 |
| 937,811 | Jenkins | Oct. 26, 1909 |
| 1,419,619 | Edwards et al. | June 13, 1922 |
| 1,432,073 | Lowy | Oct. 17, 1922 |
| 1,498,748 | Pierce, Jr. | June 24, 1924 |